US006926217B1

(12) United States Patent
LaBounty et al.

(10) Patent No.: US 6,926,217 B1
(45) Date of Patent: Aug. 9, 2005

(54) HEAVY-DUTY DEMOLITION APPARATUS WITH REPLACEABLE TIP AND ROTATABLE CROSS BLADE

(75) Inventors: Kenneth R. LaBounty, Two Harbors, MN (US); Ross D. Christenson, Esko, MN (US); Daniel P. Jacobson, Wrenshall, MN (US)

(73) Assignee: Genesis Attachments, LLC, Cedar Rapids, IA (US)

( * ) Notice: Subject to any disclaimer, the term of this patent is extended or adjusted under 35 U.S.C. 154(b) by 667 days.

(21) Appl. No.: 09/524,904

(22) Filed: Mar. 14, 2000

Related U.S. Application Data

(63) Continuation-in-part of application No. 09/267,569, filed on Mar. 12, 1999, now Pat. No. 6,119,970, which is a continuation-in-part of application No. 09/200,668, filed on Nov. 25, 1998, now Pat. No. 6,061,911.

(51) Int. Cl.$^7$ ................................................. B02C 1/10
(52) U.S. Cl. ................................. 241/266; 241/101.73
(58) Field of Search .......................... 241/266, 101.75; 30/134, 228

(56) References Cited

U.S. PATENT DOCUMENTS 4,198,747 A    4/1980  LaBounty (Continued)

FOREIGN PATENT DOCUMENTS

DE          42 05 781      2/1992

(Continued)

OTHER PUBLICATIONS

Brochure, LaBounty Universal Processor Shear Jaws Attachment.

(Continued)

*Primary Examiner*—Mark Rosaenbaum
(74) *Attorney, Agent, or Firm*—Gerald E. Helget; Briggs and Morgan, P.A.

(57) ABSTRACT

A heavy-duty demolition shear for attachment to the boom structure and hydraulic system of an excavator, has a rigid lower jaw and an upper jaw and pivot interconnecting the jaws together. The shear is attachable to the boom structure of the excavator. The upper jaw has upper shear blades, while the lower jaw has at least one lower shear blade. The lower jaw also has a rigid guide blade lying along the lower shear blade and in spaced relation therewith. The outer ends of the shear blade and guide blade are co-extensively opposed to each other so that a tie plate secures the outer ends of the lower shear blade and the guide blade together. There is an open slot between the lower shear blade and the adjacent guide blade to receive the upper shear blade and upper jaw therein. The upper jaw has a cylinder attached to the hydraulic system of the excavator for closing and opening the upper jaw relative to the lower jaw. The lower jaw and the upper jaw shear a workpiece when the upper jaw is closed upon the lower jaw. A rotatable, indexable cross blade is mounted to the tie plate substantially transverse to the lower shear blade and to the guide blade. The cross blade is seated and mounted inside the tie plate at an angle between one degree and thirty degrees, preferably about ten degrees. Thus, the cutting edge leans inwardly toward the throat of the shear, while the lower portion extends outwardly to provide upper jaw clearance within the open slot. The upper jaw includes a replaceable tip.

3 Claims, 7 Drawing Sheets

U.S. PATENT DOCUMENTS

| | | | |
|---|---|---|---|
| 4,382,625 | A | 5/1983 | LaBounty |
| 4,403,431 | A | 9/1983 | Ramun et al. |
| 4,450,625 | A | 5/1984 | Ramun et al. |
| 4,512,524 | A | 4/1985 | Shigemizu |
| 4,519,135 | A | 5/1985 | LaBounty |
| 4,543,719 | A | 10/1985 | Pardoe |
| 4,558,515 | A | 12/1985 | LaBounty |
| 4,669,187 | A | 6/1987 | Pardoe |
| 4,670,983 | A | 6/1987 | Ramun et al. |
| 4,686,767 | A | 8/1987 | Ramun et al. |
| 4,697,509 | A | 10/1987 | LaBounty |
| 4,771,540 | A | 9/1988 | LaBounty |
| 4,776,093 | A | 10/1988 | Gross |
| 4,838,493 | A | 6/1989 | LaBounty |
| 4,881,459 | A | 11/1989 | Ramun |
| 4,897,921 | A | 2/1990 | Ramun |
| 4,951,886 | A | 8/1990 | Berto |
| 5,044,569 | A | 9/1991 | LaBounty et al. |
| 5,060,378 | A | 10/1991 | LaBounty et al. |
| 5,062,227 | A | 11/1991 | De Gier et al. |
| 5,146,683 | A | 9/1992 | Morikawa et al. |
| 5,183,216 | A | 2/1993 | Wack |
| 5,187,868 | A | 2/1993 | Hall |
| 5,230,151 | A | 7/1993 | Kunzman et al. |
| 5,339,525 | A | 8/1994 | Morikawa |
| 5,384,962 | A | 1/1995 | Pemberton |
| 5,385,311 | A | 1/1995 | Morikawa et al. |
| 5,474,242 | A | 12/1995 | Rafn |
| 5,478,019 | A | 12/1995 | Morikawa et al. |
| 5,533,682 | A | 7/1996 | de Gier et al. |
| RE35,432 | E | 1/1997 | LaBounty et al. |
| 5,619,881 | A | 4/1997 | Morikawa et al. |
| 5,669,141 | A | 9/1997 | Morikawa et al. |
| 5,671,892 | A | 9/1997 | Morikawa et al. |
| 5,715,603 | A | 2/1998 | Dorguin |
| 5,860,214 | A | 1/1999 | Morikawa et al. |
| 5,873,168 | A | 2/1999 | Johnson et al. |
| 5,894,666 | A * | 4/1999 | Hrusch ............ 30/134 |
| 5,926,958 | A | 7/1999 | Ramun |
| 5,992,023 | A | 11/1999 | Sederberg et al. |
| 6,061,911 | A * | 5/2000 | LaBounty et al. ...... 30/134 |
| 6,119,970 | A * | 9/2000 | LaBounty et al. ...... 241/101.73 |
| 6,202,308 | B1 * | 3/2001 | Ramun ............ 30/134 |
| 6,298,560 | B1 * | 10/2001 | Lee ............ 30/134 |

FOREIGN PATENT DOCUMENTS

| | | |
|---|---|---|
| EP | 0 353 363 | 8/1988 |
| EP | 0751260 A1 | 2/1997 |
| GB | 2126938 A | 4/1984 |
| GB | 2236965 A | 4/1991 |
| JP | 09-195528 | 11/1997 |

OTHER PUBLICATIONS

Photographs and literature—Teledyne Shear.
Literature Vertech Shear Attachments.
Literature, Iron Ax Shears.
Photographs, Komatsu (Oyodo) Shear.
Product Drawing ORT Oberlander Shear.

* cited by examiner

HEAVY-DUTY DEMOLITION APPARATUS WITH REPLACEABLE TIP AND ROTATABLE CROSS BLADE

This is a continuation-in-part of U.S. patent application Ser. No. 09/267,569, now U.S. Pat. No. 6,119,970 filed Mar. 12, 1999, which is a continuation-in-part of U.S. patent application Ser. No. 09/200,688, filed Nov. 25, 1998, now U.S. Pat. No. 6,061,911.

BACKGROUND OF THE INVENTION

An understanding of the operation of the demolition shears or apparati like the present invention may be learned by studying U.S. Pat. No. 4,519,135, hereby incorporated by reference. This invention relates to a heavy duty demolition apparatus, especially adapted to be mounted on a rigid boom of a mobile vehicle and particularly adapted to be mounted on the dipper stick of an excavator, with a blade stabilizing device to keep the upper jaw of the apparatus from moving laterally relative to the lower jaw and breaking during the shearing operation on a workpiece.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8, 10, or 16 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. No. 4,198,747; U.S. Pat. No. 4,188,721; U.S. Pat. No. 4,897,921; U.S. Pat. No. 4,543,719; U.S. Pat. No. 4,558,515 and U.S. Pat. No. 4,104,792. Typically, these heavy duty shears mount on the dipper stick of an excavator so that the shears may be controlled fairly well in handling various types of scrap and cutting the scrap into smaller pieces and lengths.

Typically, these shears have a fixed lower jaw and a movable upper jaw that pivots on the lower jaw, with shear blades of hardened steel on both the upper jaw and the lower jaw. The workpiece is sheared by closing the upper jaw against the lower jaw under hydraulic pressure, with the shear blades cutting the workpiece.

Prior art shears have several problems. During the shearing process, metal scrap may become twisted and/or bent. Thus, sometimes the scrap or work piece gets jammed or wedged in the shear, requiring down time to cut the scrap out of the shear. Also, bending and/or twisting of metal scrap makes the scrap irregular and voluminous, thereby difficult to store and transport. Demolition shears are subject to substantial wear, again requiring down time to cut off worn parts.

There is a need for a heavy-duty demolition apparatus that minimizes the twisting and/or bending of metal scrap during the shearing process and has replaceable wear parts and blades.

SUMMARY OF THE INVENTION

A heavy-duty demolition shear for attachment to the boom structure and hydraulic system of an excavator, has a rigid lower jaw and an upper jaw and pivot interconnecting the jaws together. The shear is attachable to the boom structure of the excavator. The upper jaw has upper shear blades, while the lower jaw has at least one lower shear blade. The lower jaw also has a rigid guide blade lying along the lower shear blade and in spaced relation therewith. The outer ends of the shear blade and guide blade are co-extensively opposed to each other so that a tie plate secures the outer ends of the lower shear blade and the guide blade together. There is an open slot between the lower shear blade and the adjacent guide blade to receive the upper shear blade and upper jaw therein. The upper jaw has a cylinder attached to the hydraulic system of the excavator for closing and opening the upper jaw relative to the lower jaw. The lower jaw and the upper jaw shear a workpiece when the upper jaw is closed upon the lower jaw. A rotatable, indexable cross blade is mounted to the tie plate substantially transverse to the lower shear blade and to the guide blade. The cross blade is seated and mounted inside the tie plate at an angle between one degree and thirty degrees, preferably about ten degrees. Thus, the cutting edge leans inwardly toward the throat of the shear, while the lower portion extends outwardly to provide upper jaw clearance within the open slot. The upper jaw includes a replaceable tip.

A principal object and advantage of the present invention is that the cross blade, mounted at an angle to the tie plate, assists in producing flat scrap producing maximum storage and transport by allowing the upper shear blade to clear the cross blade more easily after initial scrap piercing and shearing.

Another principal object and advantage of the present invention is that the cross blade is rotatably mounted with four cutting surfaces that may be brought into position for shearing.

Another principal object and advantage of the present invention is that a replaceable tip is mounted to the front end of the upper jaw in such a way that it will not be sheared off by lateral forces developed during the shearing process and may be easily replaced with little down time.

Another object and advantage of the present invention is that all blades are rotatable and indexable, each presenting four blade edges for maximum usage and shearing.

Another object and advantage of the present invention if that the lower jaw primary shearing blade is approximately twice the length of the secondary blade, again assisting in producing flat scrape.

DETAILED DESCRIPTION OF THE PREFERRED EMBODIMENTS

Figure 1:
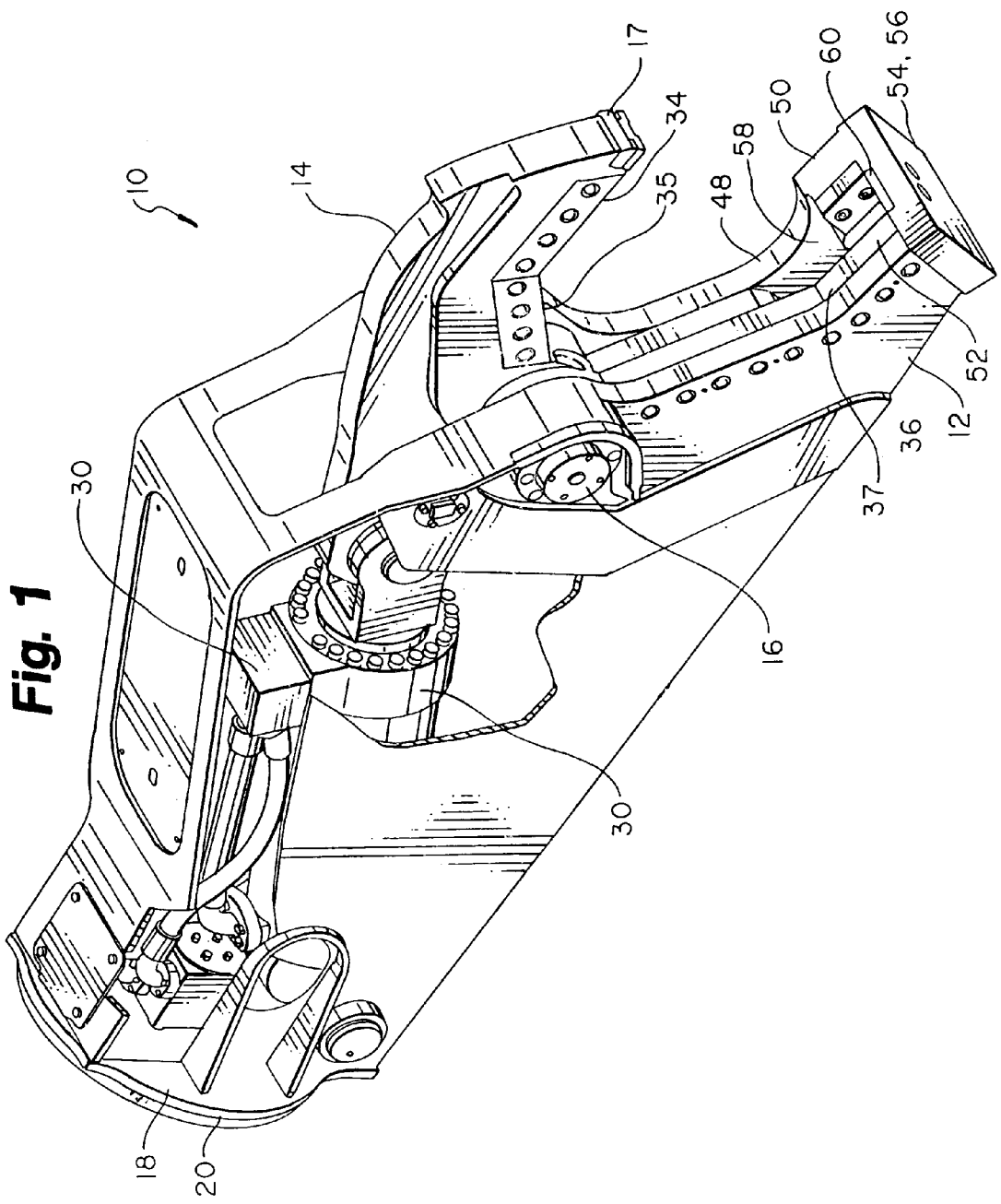
FIG. 1 is a right-side perspective view of the heavy-duty demolition apparatus or shear of the present invention.
Figure 2:
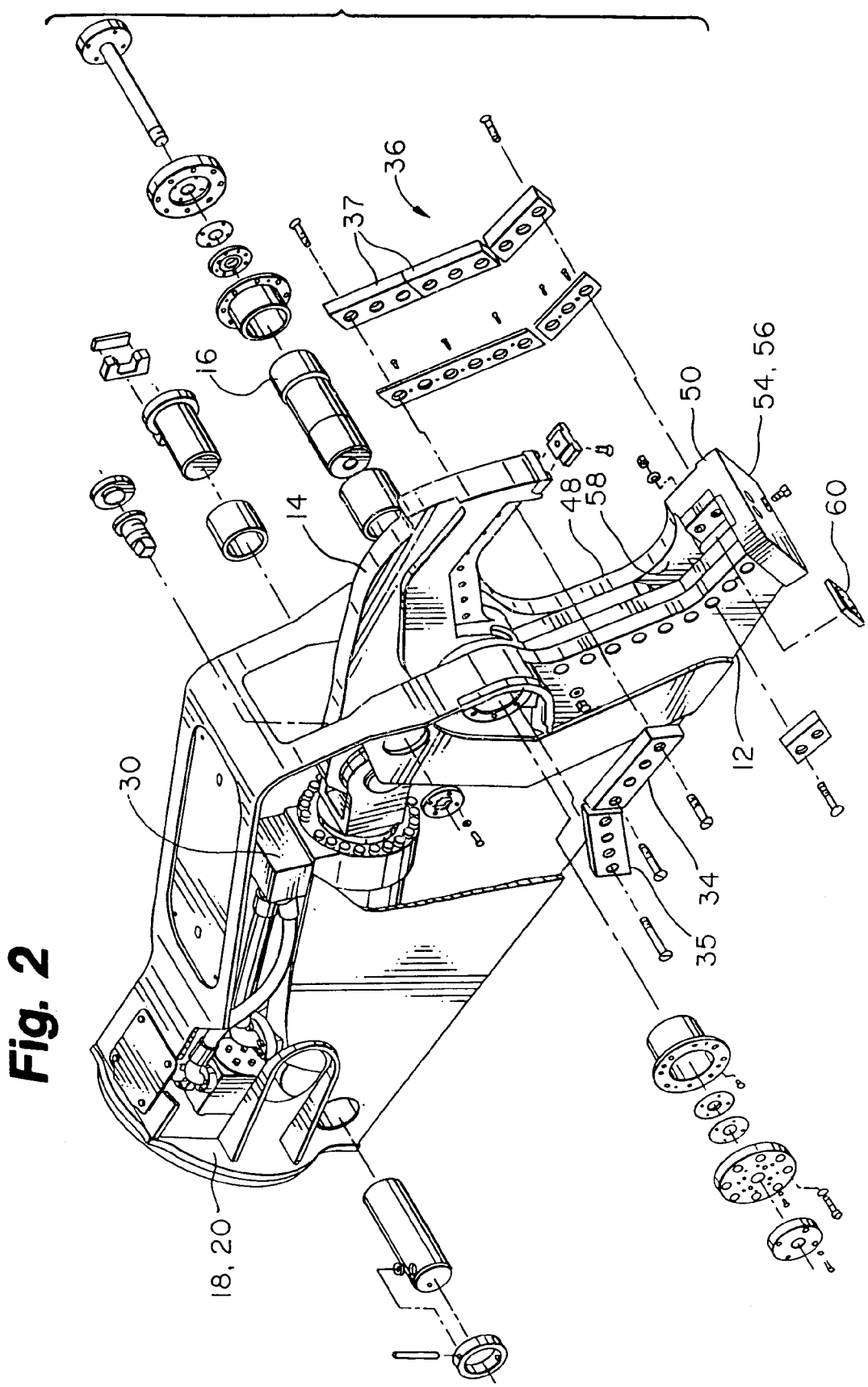
FIG. 2 is an exploded perspective view of the heavy-duty demolition apparatus of the present invention.

The heavy-duty demolition apparatus of the present invention is generally referred to in the Figures as reference numeral 10.

Referring to FIGS. 1 through 6, the heavy-duty demolition apparatus or shear 10 comprises a lower jaw 12, an upper jaw 14, pivot means 16 interconnecting the lower jaw 12 and upper jaw 14, and means 18 for attachment to the excavator. The means 18 may further include a rotator unit 20 allowing rotation of the demolition unit 10 about a longitudinal axis. The apparatus 10 also includes means 30 for attachment to the hydraulic system of an excavator (not shown) for closing and opening the upper jaw relative to the lower jaw.

The upper jaw 14 has an upper shear secondary blade 34 and primary blade 35. The lower jaw 12 has a lower secondary shear blade 36 and primary blade 37 extending along each other for shearing a workpiece when the upper shear blades 34 and 35 are closed upon the lower shear blades 36 and 37. Preferably, the shear blades 34, 35, 36, and 37 are replaceable. Lower primary blade 37 is approximately twice as long as secondary blade 36.

Preferably, the apparatus 20 further comprises a guide blade 48 on the lower jaw 12 lying along the lower shear blade 36, 37 and in spaced relation therewith. The outer end 50 of the guide blade and outer end 52 of the shear blade are adjacent each other. Rigid means 54 securing the outer ends 50, 52 together. The rigid means 54 is preferably a nose or tie plate 56.

An open slot 58 preferably exists between the lower shear blade 36 and the adjacent guide blade 48 to receive the upper jaw 14 and shear blade 34, 35 therein. The open slot 58 has a width wider than the thickness of the upper jaw 14 to maintain open space between the upper jaw 14 and the guide blade 48 when the upper shear blade 34 is in the open slot 58.

A cross blade 60 is mounted to the tie plate 56 substantially transverse to the lower shear blade 36 and to the guide blade 48. The cross blade 60 cooperates with the upper shear blade 36 in piercing and shearing the workpiece.

Figure 4:
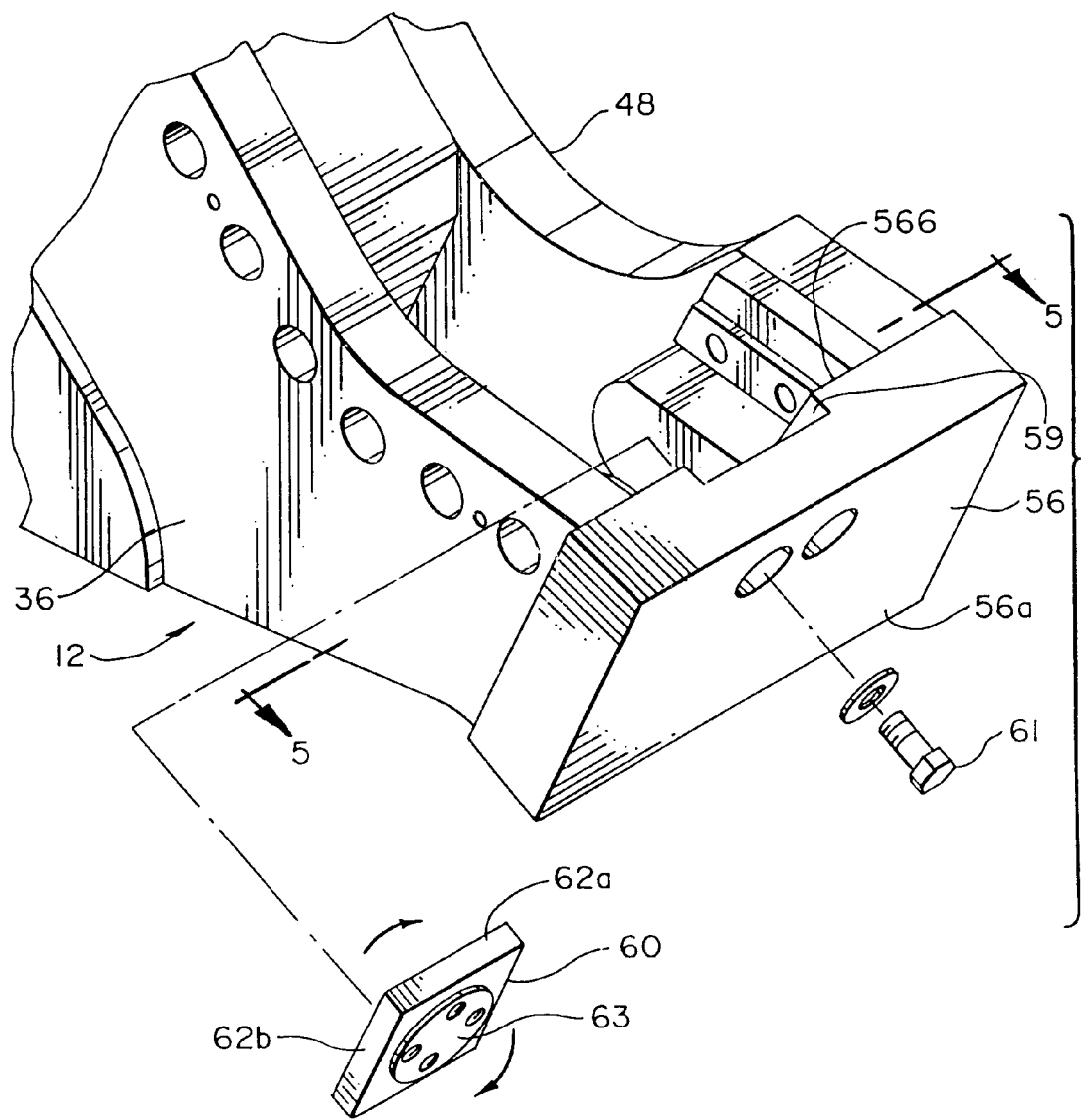
FIG. 4 is a detailed front perspective view of the broken away front end of the lower jaw of the heavy-duty demolition apparatus.
Figure 5:
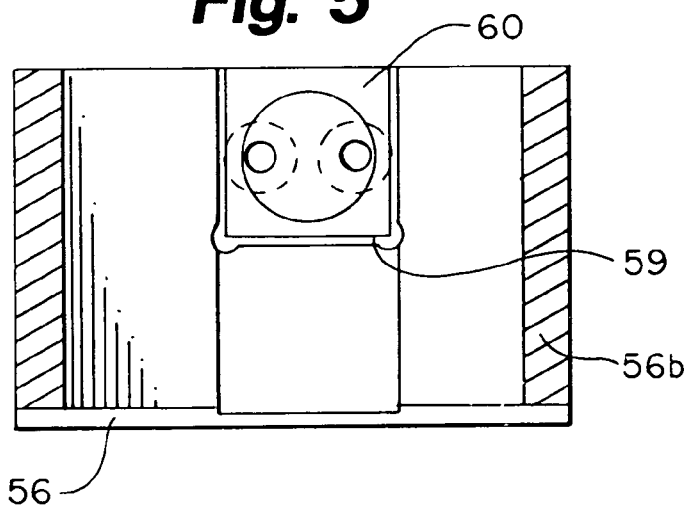
FIG. 5 is a cross-section approximately at the lines 5 of FIG. 4.

As best seen in FIGS. 4 and 5, the tie plate 56 has an outer surface 56a, and an inner surface 56b adjacent the open slot 58. Preferably, the inner surface 56b has a recess 59, and the cross blade 60 is mounted in the recess 59. Suitably, the cross blade 60 may be mounted to the tie plate 56 by bolts 61. The cross blade may be removably mounted to the tie plate 56, as for example by removing the bolts 61.

Figure 6:
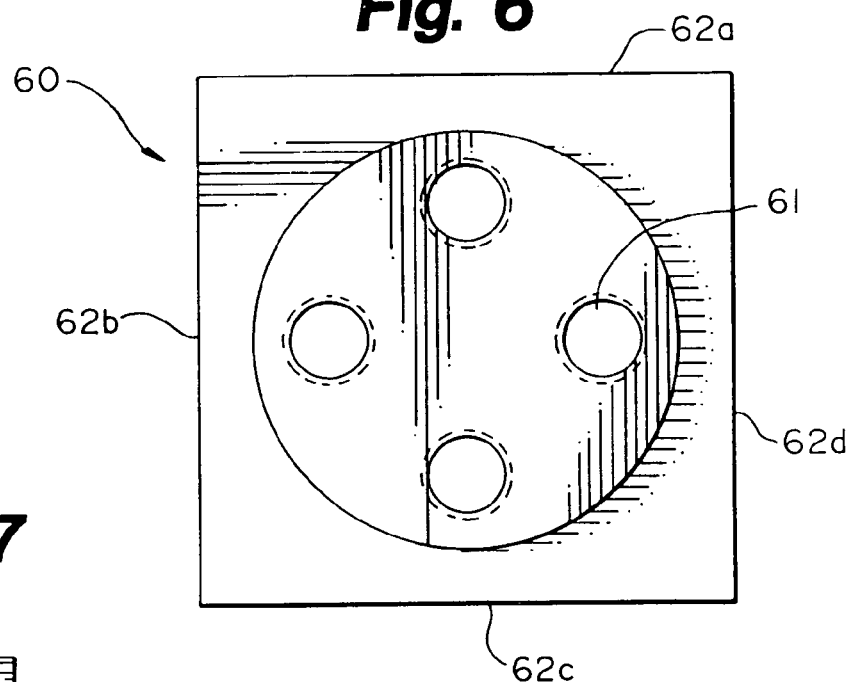
FIG. 6 is a front elevational view of the rotatable, indexable lower cross blade of the heavy-duty demolition apparatus of the present invention.
Figure 7:
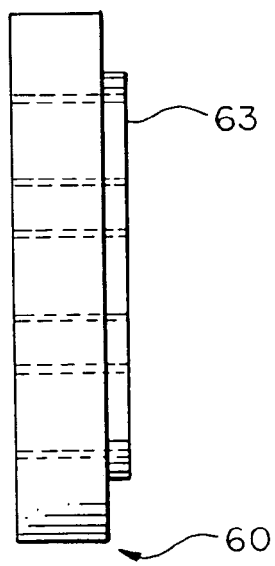
FIG. 7 is a side elevational view of the lower cross blade of the heavy-duty demolition apparatus of the present invention, taken approximately at the lines 7 of FIG. 6.

The cross blade 60 preferably has a plurality of cutting surfaces 62a, 62b (FIG. 4) and the cross blade is rotatably mounted to the tie plate 56 whereby each of the plurality of cutting surfaces 62 which may be successively exposed for shearing the workpiece, as shown by the arrows in FIG. 4. Most preferably, the cross blade 60 has four cutting surfaces 62a, 62b, 62c, 62d (FIG. 6).

Figure 3:
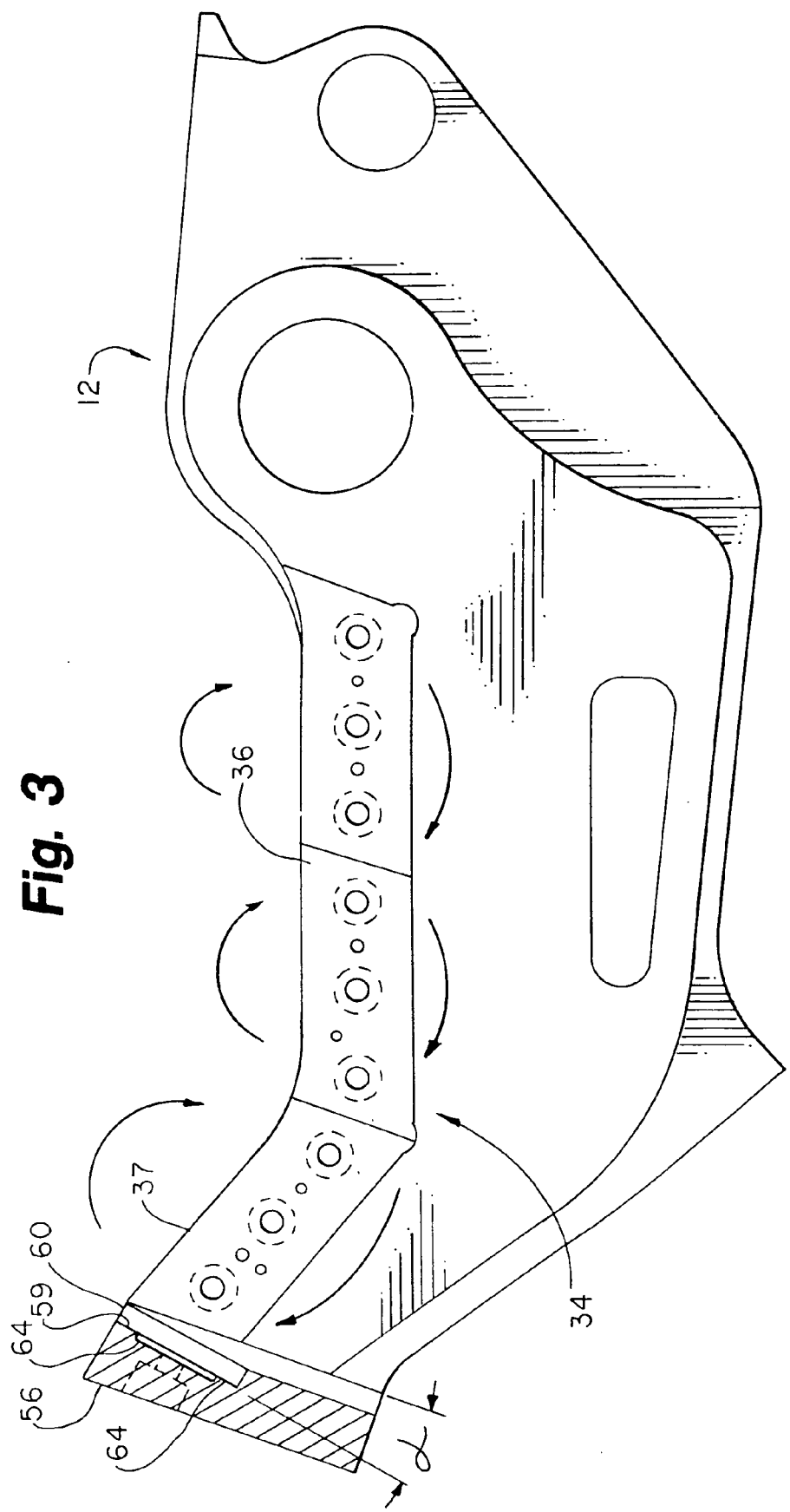
FIG. 3 is a left-side elevational view of the lower shearing jaw of the heavy-duty demolition apparatus with the guide blade removed for easy viewing.

To aid in mounting the cross blade 60 to the tie plate 56, the cross blade 60 may have a shoulder or flange 63 which abuts against an indexing step or recess 64 in the tie plate 56 (FIG. 3).

As best seen in FIG. 3, the cross blade 60 preferably forms a first angle $\alpha$ therebetween. It has been found advantageous, that setting the cross blade 60 into the tie plate 56 at an angle with top cutting edge 62a leaning inwardly towards the shear 10 throat or pivot 16, and lower edge 62c extending outwardly, assists in producing sheared scrap that is flat, rather than bent or twisted. Also, shear 10 is less likely to become jammed. This is because the angle $\alpha$ allows the upper shear blade 34 to clear the cross blade 60 more easily as the upper shear blade 34 pierces and shears at edge 62a and enters the space 58. The angle $\alpha$ is acute, preferably between one degree and thirty degrees, more preferably between one degree and twenty degrees, and most preferably about ten degrees.

The lower shear blade 36, 37 preferably comprises a primary blade 36 and a secondary blade 37. The primary lower shear blade 36 is distal from the tie plate 56, while the secondary lower shear blade 37 lies adjacent to the tie plate 56 and cross blade 60. The primary lower shear blade 36 is longer than the secondary lower shear blade 37, and most preferably is twice as long as the secondary lower shear blade 36. It has been found that the above structure assists in producing flat cut scrap.

Each of the primary lower shear blade 36 and secondary lower shear blade 37 may have four cutting surfaces. As shown in FIG. 3, the blades 36, 37 may be rotatably mounted and flipped around in the lower jaw 12 to successively bring each of the four cutting surfaces into position for shearing the workpiece (as shown by the arrows).

Figure 8:
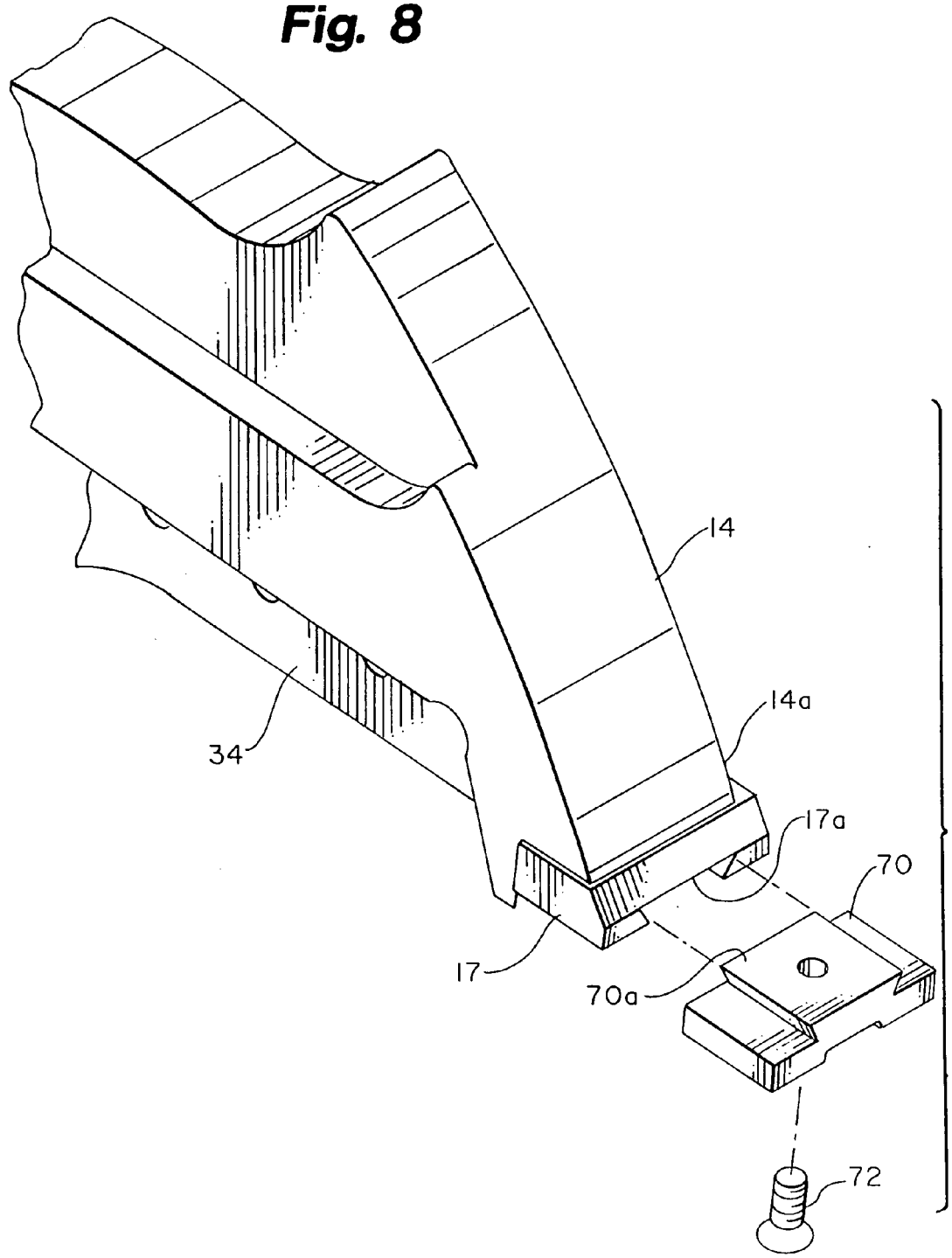
FIG. 8 is a detailed perspective broken away view of the front end of the upper jaw of the heavy-duty demolition apparatus of the present invention, with the replaceable tip exploded out.
Figure 9:
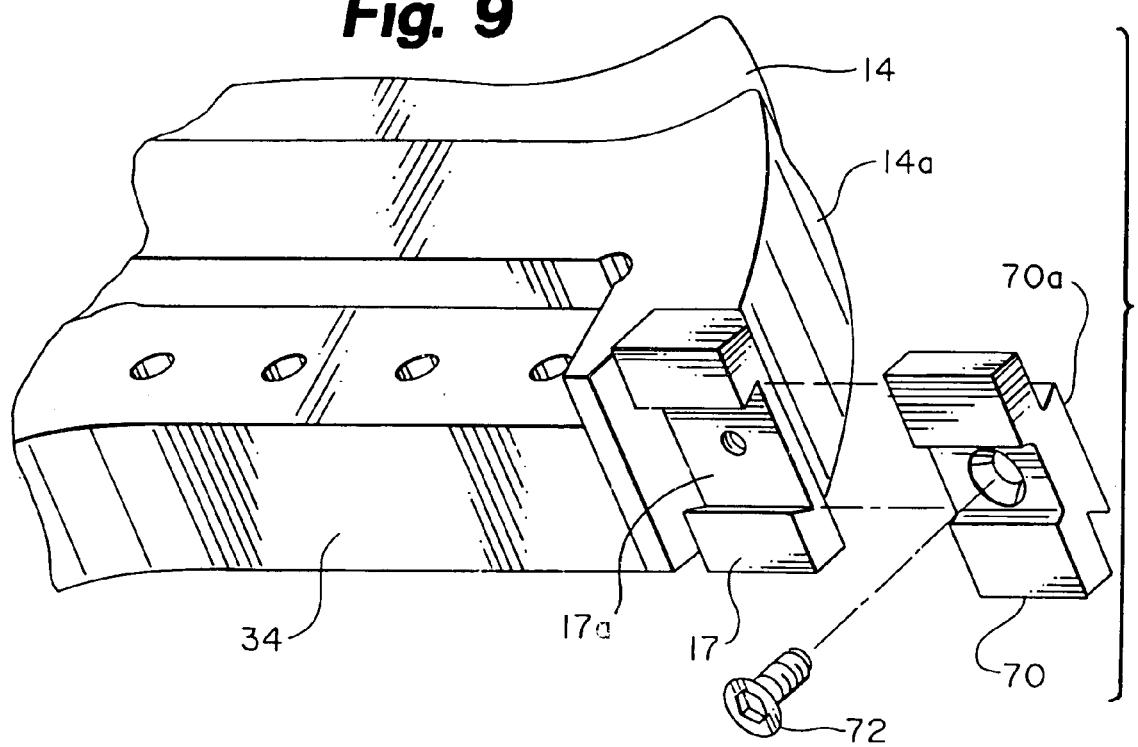
FIG. 9 is similar to FIG. 8, taken from below the upper jaw.
Figure 10:
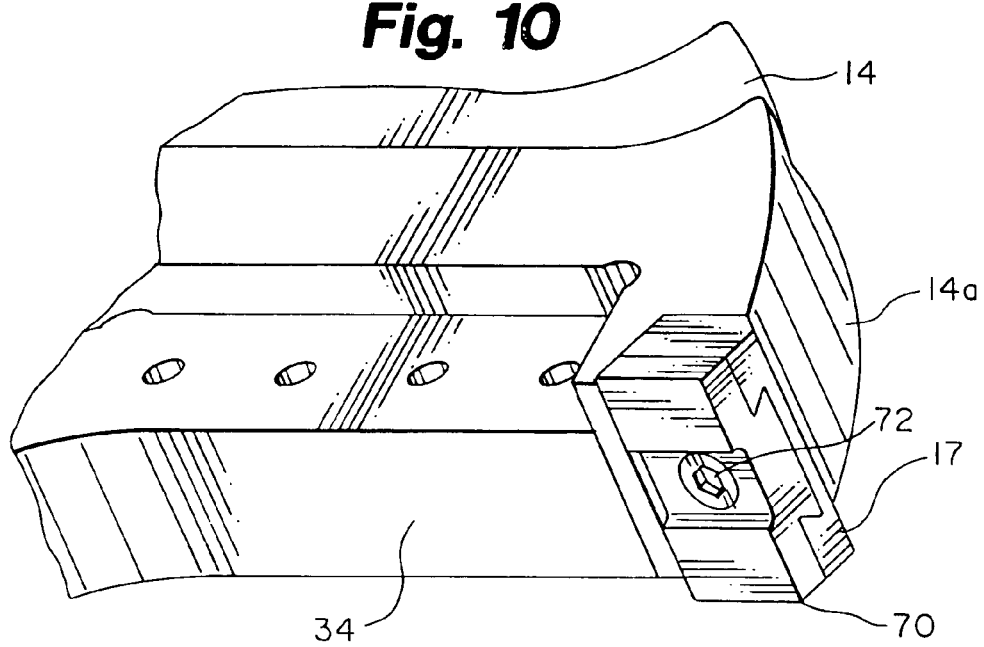
FIG. 10 is the same as FIG. 9, with the replaceable tip inserted on the upper jaw.

As best seen in FIGS. 8–10, the upper jaw 14 has a front end 14a distal from the pivot means 16. A replaceable tip 70 may be mounted at the front end 14a and welded on seat 17. The replaceable tip 70 is preferably made of hardened steel.

To prevent the replaceable tip 70 from being sheared off by lateral forces developed during the shearing process, the replaceable tip 70 preferably comprises a dovetail portion 70a that interlocks with a mortise 17a formed in the front end seat 17 of the upper jaw 14. The replaceable tip 70 may be suitably mounted to the seat 17 by bolts 72.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A heavy-duty demolition apparatus for attachment to the boom structure and hydraulic system of an excavator, comprising:

(a) a lower jaw and an upper jaw and pivot means interconnecting the jaws together, means for attachment to the boom structure of the excavator, the upper jaw having an upper shear blade, the lower jaw having at least one lower shear blade, the lower jaw also having a rigid guide blade lying along the lower shear blade and in spaced relation therewith, the outer ends of the shear blade and guide blade being adjacent each other, and a tie plate securing the outer ends of the lower shear blade and the guide blade together, further comprising an open slot between the lower shear blade and the adjacent guide blade to receive the upper shear blade therein, and the upper jaw having means for attachment to the hydraulic system of the excavator for closing and opening the upper jaw relative to the lower jaw; the lower jaw and the upper jaw shearing a workpiece when the upper jaw is closed upon the lower jaw;

(b) an indexable, rotatable cross blade removably mounted to the inside of the tie plate substantially transverse to the lower shear blade and to the guide blade, the cross blade having four cutting surfaces for successive exposure and shearing;

(c) an indexable, replaceable piercing and shearing tip removably mounted in a seat at the distal end of the upper jaw; and (d) wherein the cross blade and the tie plate form a first angle therebetween between one and thirty degrees.

2. The heavy-duty demolition apparatus of claim 1, further comprising shear blades, one being a primary shear blade lying distal from the tie plate and the other being a secondary shear blade lying adjacent to the tie plate.

3. The heavy-duty demolition apparatus of claim 1, wherein the replaceable tip further comprises a dovetail portion interlocking with a mortise portion on the upper jaw.

\* \* \* \* \*